J. S. BLYMYER.
Evaporating-Pan.

No. 219,797.                    Patented Sept. 23, 1879.

Witnesses:
Donn P. Twitchell
D. P. Cowl

Inventor:
J. S. Blymyer
By Dodge & Son,
Attys.

UNITED STATES PATENT OFFICE.

JOHN S. BLYMYER, OF CINCINNATI, OHIO.

IMPROVEMENT IN EVAPORATING-PANS.

Specification forming part of Letters Patent No. 219,797, dated September 23, 1879; application filed April 2, 1879.

*To all whom it may concern:*

Be it known that I, JOHN S. BLYMYER, of Cincinnati, in the county of Hamilton and State of Ohio, have invented certain Improvements in Evaporating-Pans, of which the following is a specification.

My invention relates to improvements in that class of pans in which a continuous evaporation and defecation of a shallow moving stream of juice is carried on, the operation being generally known in the art as the "Cook process."

The improvement consists in providing a pan which has the usual transverse partitions to cause a serpentine flow of the juice, with a depressed side to permit the escape of the scum, an outside trough to return the scum to the head of the pan, and a side cover to cause the scum to flow over the depressed side into the trough; in constructing the cover in independent sections, corresponding with the compartments of the pan; in providing the cover with an upturned edge, and in minor details hereinafter explained.

Figure 1:
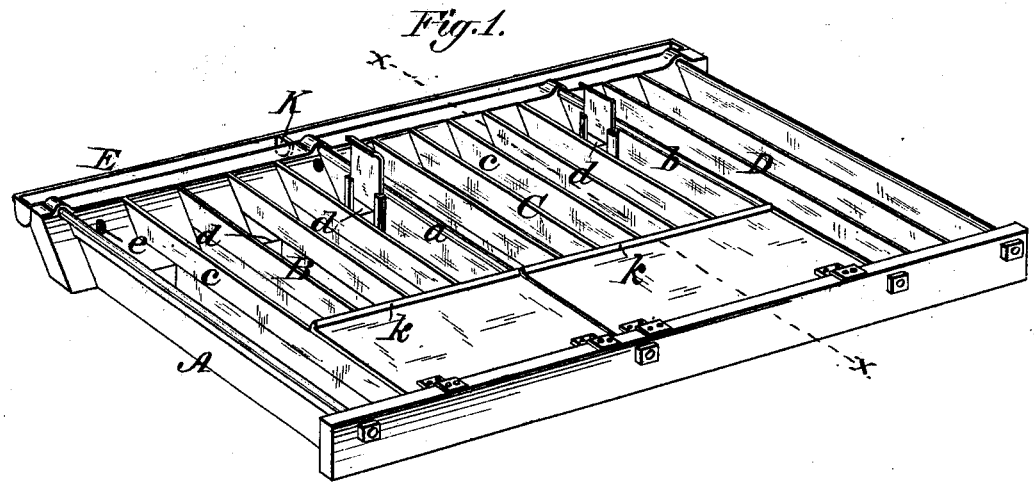
Figure 2:
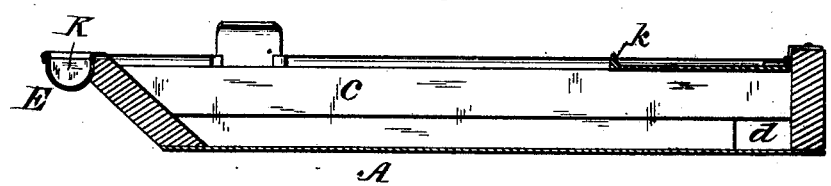

Figure 1 represents a perspective view of the pan; Fig. 2, a cross-section on the line $xx$.

A represents a pan, similar in general form and construction to those now in use, divided by transverse partitions $a$ $b$ into three sections or compartments, B C D, which are divided by partitions $c$ into the usual transverse channels, which communicate with each other on alternate sides of the pan through openings $d$, in such manner that the juice in flowing through the pan is caused to pass through the entire length of the successive channels from side to side of the pan, as usual.

The main partitions are provided each with an opening and a gate to vary the size of the same, and thereby control the flow of the juice, according to its condition as it flows through the successive compartments. On one side the edge of the pan is cut down or reduced in height the entire length to such extent that when the juice is at the usual height the scum which rises to the surface will flow over said edge and escape. Upon the depressed side of the pan there is secured an outside trough, E, having a downward inclination toward the head or receiving end of the pan, in order to conduct the scum thereto.

In order to permit the scum or the sirup deposited thereby to pass from the trough into the pan, an opening, $e$, is made from one to the other, as shown.

If it is desired to deliver the scum only from one compartment to the next, one or more additional openings may be made from the trough to the pan at suitable points, and the trough provided, as shown, with a movable partition, K, to check the flow in the trough and direct it through the required opening.

When the flow is to take place through the entire length of the trough the partitions will all be removed, and all the openings, except the one at the head, closed by inserting plugs into them or otherwise.

On the opposite side of the pan from the trough there is a longitudinal cover extending partly across the pan, and fitting down closely upon the partitions, as shown. This cover will be hinged or otherwise secured, so that it may be turned up or removed at will; and in order to admit of the required treatment of the juice in the different compartments the cover is divided transversely into independent sections. This construction is a feature of importance, since the juice is changed in condition and subjected to a change in temperature as it advances.

The sectional construction of the cover permits such treatment in each compartment as circumstances may require. The cover serves the double purpose of confining the heat, and of causing the scum which rises to the surface to move to the opposite side of the pan and over the side into the trough.

The cover is of special value in connection with, and has a particular operation in combination with, the transverse partitions, in that the two together cause the scum to move as soon as it rises to the opposite side, for discharge or removal, so that it is prevented from advancing with the current of juice and remaining in the pan, so as to be boiled down with the sirup. Were it not for the partitions the scum would remain much longer upon the surface of the juice, and would, in consequence of the dark and impure matters contained in it, give the sirup a dark and clouded appearance.

It will be noticed that the cover has its inner edge extended upward vertically, as shown at K, which is for the double purpose of preventing the scum, which rises higher at the center than at the sides, from working over on top of the cover, and of affording a barrier from which the scum will work away.

In operating the pan it will be placed like the well-known Cook pan described in reissued Patent No. 8,341, dated July 26, 1878, upon a furnace, and subjected to the direct action of the heat longitudinally beneath its central portion, so that the juice flowing from side to side is heated at the center and permitted to cool to a limited extent at the sides. It is this repeated heating and cooling of the juice that gives to the cover its peculiar efficiency in connection with the transverse partitions, and enables the apparatus to cause the rapid separation and discharge of the scum and feculent matters.

I do not claim, broadly, a cover upon one side of an evaporating-pan, as I am aware that a plain open pan has been provided with such cover. Nor do I claim a cover made in sections, except when combined with a pan such as shown and in the manner set forth. Neither do I claim, broadly, a pan having one side depressed or cut away, and provided with a trough to return the scum to the end of the pan. Neither do I claim a pan having several compartments communicating at alternate ends, when such apartments are made without transverse partitions, and each provided in one end with a block.

My special construction of the pan with its depressed side, its several compartments each divided into a series of channels, and its sectional side cover is advantageous in that it secures the continuous flow and reduction of the juice, as in the Cook process, together with the instantaneous and automatic delivery of the scum, and the capability of subjecting the juice to a varying treatment while flowing back and forth through the channeled compartments.

What I do claim is—

1. The evaporating-pan provided with the transverse partitions, having openings at alternate ends, with the depressed or cut-away side, and with the outside trough to return the scum to the head of the pan.

2. The combination of the pan having one side depressed or cut down to permit the escape of the scum, the transverse partitions having openings at alternate ends, and the cover applied to the pan on the side which is not cut down, as shown, whereby the scum is compelled to escape over the depressed side.

3. In combination with the evaporating-pan, the side cover provided with the upwardly-extending edge, as and for the purpose described.

4. In combination with the evaporating-pan having the depressed side, the inclined longitudinal trough and the adjustable partition in said trough.

5. The combination of the pan having one side depressed or cut down, the main partitions dividing the pan into compartments, the secondary transverse partitions dividing the compartments into channels, and provided with the openings at alternate ends, and the independent side covers applied to the respective compartments over the partitions therein.

J. S. BLYMYER.

Witnesses:
FRANK E. McCORD,
HENRY SPEER, Jr.